United States Patent
Kruglick

(10) Patent No.: US 8,520,505 B1
(45) Date of Patent: Aug. 27, 2013

(54) COMBINED HARD/SOFT RELAY FORWARDING FOR HYBRID-AUTOMATIC REPEAT REQUEST (ARQ) EXPLOITATION

(75) Inventor: Ezekiel Kruglick, Poway, CA (US)

(73) Assignee: Empire Technology Development, LLC, Wilmington, DE (US)

( * ) Notice: Subject to any disclaimer, the term of this patent is extended or adjusted under 35 U.S.C. 154(b) by 0 days.

(21) Appl. No.: 13/642,485

(22) PCT Filed: May 14, 2012

(86) PCT No.: PCT/US2012/037817
§ 371 (c)(1),
(2), (4) Date: Oct. 19, 2012

(51) Int. Cl.
*H04L 12/26* (2006.01)
*H04L 1/18* (2006.01)
*H04B 7/14* (2006.01)

(52) U.S. Cl.
USPC ............. 370/216; 370/315; 370/328; 455/8; 714/748

(58) Field of Classification Search
None
See application file for complete search history.

(56) References Cited

U.S. PATENT DOCUMENTS

| | | | |
|---|---|---|---|
| 2008/0031168 A1* | 2/2008 | Bucknell et al. | 370/310 |
| 2010/0153806 A1* | 6/2010 | Yu et al. | 714/749 |
| 2010/0246477 A1* | 9/2010 | Hasegawa | 370/315 |
| 2010/0278036 A1* | 11/2010 | Dai et al. | 370/216 |
| 2010/0284448 A1 | 11/2010 | Miyoshi et al. | |
| 2010/0296431 A1* | 11/2010 | Terry et al. | 370/315 |
| 2011/0044379 A1 | 2/2011 | Lilleberg et al. | |
| 2012/0263100 A1* | 10/2012 | Yuan et al. | 370/315 |

OTHER PUBLICATIONS

International Search Report and Written Opinion issued in application PCT/US12/37817, filed May 14, 2012.
Pu et al., "Continuous Network Coding in Wireless Relay Networks," INFOCOM 2008. The 27th Conference on Computer Communications. IEEE, Issue Date: Apr. 13-18, 2008, pp. 1526-1534; May 2, 2008.
Laneman et al., "Cooperative Diversity in Wireless Networks: Efficient Protocols and Outage Behavior," IEEE Trans. Inf. Theory, vol. 51, No. 12, pp. 3062-3080, Dec. 2004.
Chen et al., "Modulation and Demodulation for Cooperative Diversity in Wireless Systems," IEEE Trans. Wireless Com., vol. 5, No. 7, pp. 1785-1794, Jul. 2006.
Gomadam et al., "Optimal Relay Functionality for SNR Maximization in Memoryless Relay Networks," IEEE J. Sel. Areas Com., vol. 25, No. 2, pp. 390-400, Feb. 2007.
Gomadam, K.S., and Jafar, S. A., "Optimal Relay Functionality for SNR Maximization in Memoryless Relay Networks," Journal on Selected Areas in Communications, IEEE, vol. 25, Issue 2, pp. 390-401 (2007).

(Continued)

*Primary Examiner* — Ian N Moore
*Assistant Examiner* — Eric P Smith
(74) *Attorney, Agent, or Firm* — Turk IP Law, LLC

(57) ABSTRACT

Technologies are generally presented for a relay forwarding system combining a data efficiency of soft forwarding that increases generalized signal-to-noise ratio (GSNR) with the ability to use hybrid-automatic repeat requests (H-ARQs) substantially high throughput levels may be maintained by using repair instead of packet re-requests. A relay may receive an incoming signal and perform both a soft forward to a relay destination and a non-forwarded hard decode within the relay. The hard decode results may be analyzed for errors locally to detect suspected bit errors and H-ARQ ACK/NACK signals may be sent so that retransmission can be obtained before a rolling buffer in the relay reaches frame end.

18 Claims, 7 Drawing Sheets

(56) References Cited

OTHER PUBLICATIONS

Karim, M.A., et al., "A Novel Soft Forwarding Technique for Memoryless Relay Channels Based on Symbol-Wise Mutual Information," Communications Letters, IEEE, vol. 14, Issue 10, pp. 927-929 (2010).

Peters, S.W., et al., "Relay architectures for 3GPP LTE-advanced," EURASIP Journal on Wireless Communications and Networking, vol. 2009, pp. 1-14 (2009).

Xiao, L., et a. "Mobile Relaying: Coverage Extension and Throughput Enhancement," Transactions on Communications, IEEE, vol. 58, Issue 9, pp. 2709-2717 (2010).

Yang, Y., et al., "Relay technologies for WiMAX and LTE-advanced mobile systems," Communications Magazine, IEEE, vol. 47, Issue 10, pp. 100-105 (2009).

* cited by examiner

COMBINED HARD/SOFT RELAY FORWARDING FOR HYBRID-AUTOMATIC REPEAT REQUEST (ARQ) EXPLOITATION

BACKGROUND

Unless otherwise indicated herein, the materials described in this section are not prior art to the claims in this application and are not admitted to be prior art by inclusion in this section.

Memoryless relay protocols have increasingly become popular thanks to their low complexity, small processing delay, and low energy consumption. Such relay protocols may be primarily categorized into three types: amplify-and forward (AF), detect-and-forward (DF), and estimate and-forward (EF). In general, any implementation that resolves symbols and digital data before re-encoding and transmitting again (including DF and some AF implementations) is a "hard" forward since the original signal is lost. Relay protocols where the signal is retransmitted based on phase and magnitude (including EF and some AF implementations) are known as "soft" forwards as they can be exploited by data reconstruction strategies at the end of the relay.

A performance of a practical wireless network including several relay nodes may be largely determined by the intermediate relay functionality. Any wrong decision that is made at the early hops can lead to severe error propagation to the later hops and may be detrimental to the network performance The idea of forwarding soft rather than hard information is an effective option to combat this kind of error propagation. Instead of transmitting hard decision symbols from the relay, a soft forwarding method such as EF may maximize the generalized signal-to-noise ratio (GSNR) at the destination and may outperform AF and DF in many configurations. However, GSNR optimality may not guarantee bit error rate (BER). Furthermore, EF systems cannot exploit the hybrid-automatic repeat request (H-ARQ) rapid retransmission systems that are built into Long Term Evolution (LTE) and similar standards. Thus, any data errors in an EF system may result in packet re-requests that impact network congestion.

SUMMARY

The present disclosure generally describes technologies for combined hard and/or soft relay forwarding for hybrid-automatic repeat request exploitation.

According to some examples, a method for relaying data in a wireless communication network may include receiving incoming data at a relaying device, performing soft-forwarding of the received data to a relay destination, performing a hard decoding based error check on the received data at the relay device, and requesting a retransmission from a device transmitting the incoming data if the error check indicates an error.

According other examples, a wireless communication network may include a plurality of user equipment (UE); one or more base stations acting as one of a source or a destination; and one or more relaying devices. The relaying devices may receive incoming data, perform soft-forwarding of the received data to the relay destination, perform a hard decoding based error check on the received data, and request a retransmission from a device transmitting the incoming data if the error check indicates an error.

According to further examples, a computer-readable storage medium may include instructions stored thereon for relaying data in a wireless communication network. The instructions may include receiving incoming data at a relaying device; performing soft-forwarding of the received data to a relay destination; performing a hard decoding based error check on the received data at the relay device; and requesting a retransmission from a device transmitting the incoming data if the error check indicates an error.

According to yet other examples, a relaying device for a wireless communication network may include a receive module configured to receive incoming data; a soft-forwarding logic to perform soft-forwarding of the received data to a relay destination; and a hybrid-automatic repeat request (H-ARQ) module. The H-ARQ module may perform a hard decoding based error check on the received data and request a retransmission from a device transmitting the incoming data if the error check indicates an error.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
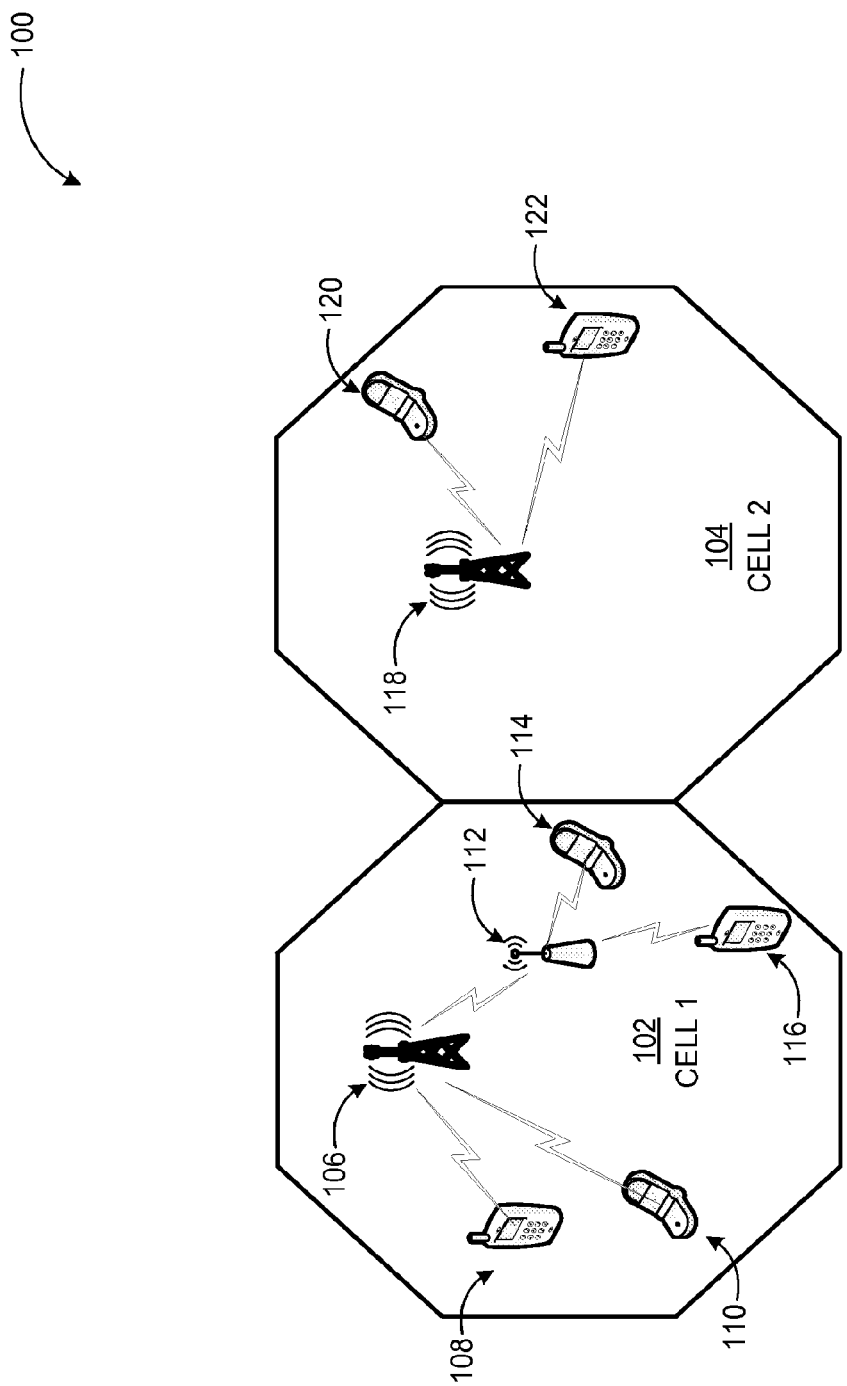
FIG. 1 illustrates an example system, where combined hard / soft relay forwarding may be used for hybrid-automatic repeat request (H-ARQ) exploitation.

In the following detailed description, reference is made to the accompanying drawings, which form a part hereof In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to combined hard and/or soft relay forwarding for hybrid-automatic repeat request exploitation.

Briefly stated, technologies are presented for a relay forwarding system combining a data efficiency of soft forwarding that increases generalized signal-to-noise ratio (GSNR) with the ability to use hybrid-automatic repeat requests (H-ARQs) substantially high throughput levels may be maintained by using repair instead of packet re-requests. A relay may receive an incoming signal and perform both a soft forward to a relay destination and a non-forwarded hard decode within the relay. The hard decode results may be analyzed for errors locally to detect suspected bit errors and H-ARQ ACK/NACK signals may be sent so that retransmission can be obtained before a rolling buffer in the relay reaches frame end.

The term "data" as used herein in conjunction with forwarding and relaying between different components of a wireless communication network such as relaying devices refers to data encoded on wireless signals, which is processed by each component to varying degrees. The wireless signals may be analog or digital. The term "base station" as used herein includes any component of a wireless communication network (e.g., a cellular network) expressing eNodeB capabilities including, e.g. femtocells.

FIG. 1 illustrates an example system, where combined hard/soft relay forwarding may be used for hybrid-automatic repeat request (H-ARQ) exploitation, arranged in accordance with at least some embodiments described herein. A system according to embodiments may be implemented in any wireless communication system employing relaying. One example includes cellular communication systems.

As shown in a diagram 100, a cellular communication system is based on cells, where a relay device or base station (e.g., relay device 106) facilitates communication between user equipment (e.g. cellular phones 110, 114; smart phones 108, 116; etc.) within the cell 102, as well as user equipment in other cells. A relay device may be a cellular phone, a base station, a tower, or any comparable special purpose device. Cell 104 is another example cell with relay device 118 facilitating communication for cellular phone 120 and smart phone 122.

In a typical scenario, signals from the user equipment (UEs) may be received at respective relay devices of the cells and relayed to other relay devices or a central controller of the network. In some cases, multiple relays may be employed in the signal transmission path. For example, the signals from cellular phone 114 and smart phone 116 may be received at relay 112 and forwarded to the relay device 106 or vice versa. The cellular phone 114 in particular being close to the cell 104 is a good example of when towers need relays due to inter-cell effects. Of course the relay levels may be as many as practically needed.

For a generalized relay forwarding data a "soft" relay based on Estimate-and-Forward (EF) provides optimum performance in terms of delivering the most data in a given time for a given channel. The EF (and some AF) systems forward based on phase and magnitude and this allows the final receiver to engage in many sorts of information theory based optimizations that results in more data arriving. The benefit is even higher for any parallel or changing relay scenario.

The H-ARQ behavior may be built into the physical layer of LTE systems. H-ARQ includes the downlink holding a small amount of data in a buffer and the receiver rapidly (typically within an 8 ms response time or sub-frame level speed) computing error checks on decoded data and either acknowledging correct receipt (ACK) or issuing a no-acknowledge (NACK) that the data did not arrive correctly. If a NACK is returned the previous sender may retransmit the corrupted data immediately while it is still in the rolling buffer and typically this may be fast enough that there is no packet re-request or other network impact. A system employing LTE standard typically converts as much BER margin into bandwidth as possible, resulting in rather high "raw" physical layer error rates. The sub-frame time period needed for H-ARQ behavior is lower than the typical bidirectional forwarding delay so H-ARQ is generally incompatible with soft forwarding.

In a system according to some embodiments, the soft and hard decoding may be combined, where a relay may receive an incoming signal and perform both a soft forward to a relay destination and a non-forwarded hard decode within the relay. The hard decode results may be analyzed for errors locally to detect suspected bit errors and retransmission can be obtained before a rolling buffer in the relay reaches frame end.

Figure 2:
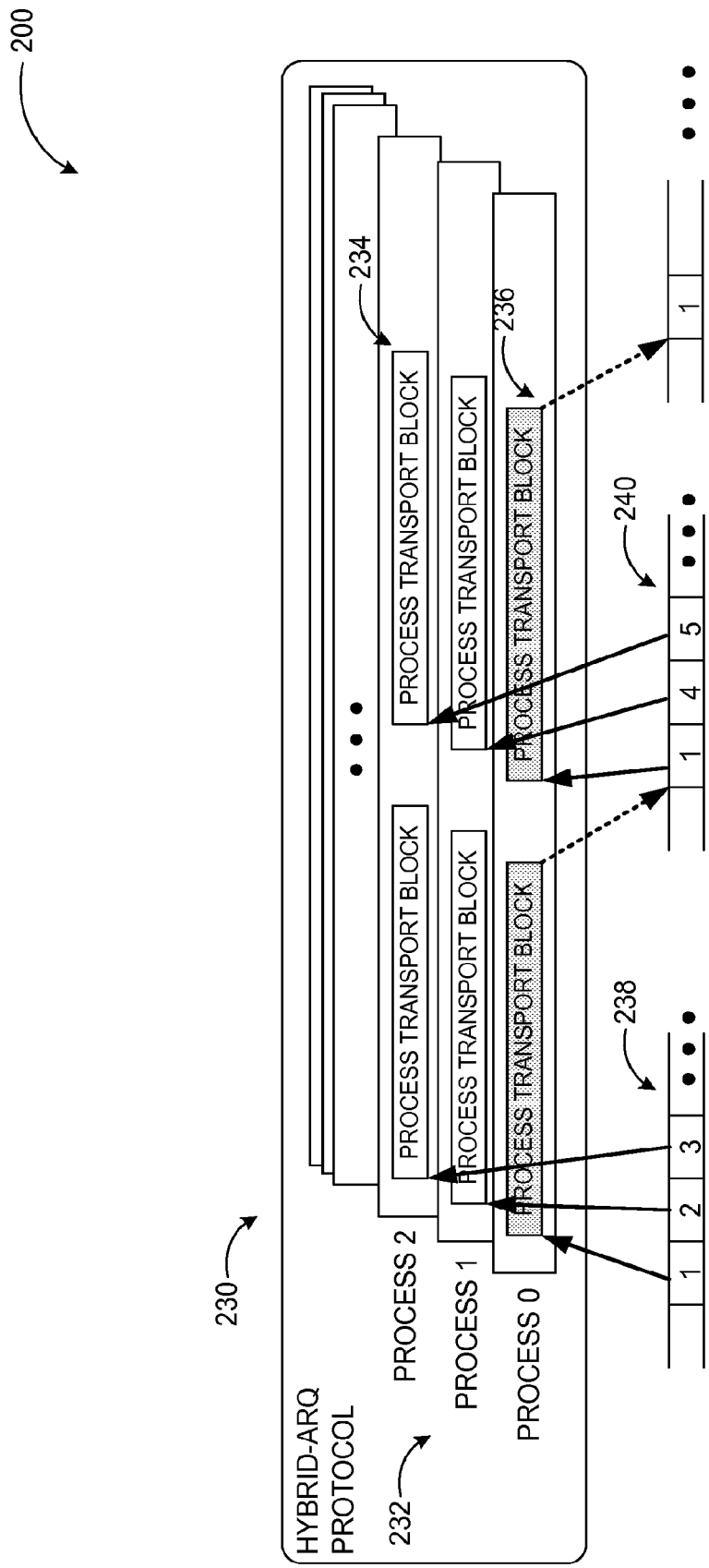
FIG. 2 illustrates conceptually an example protocol for H-ARQ with soft combining.

FIG. 2 illustrates conceptually an example protocol for H-ARQ with soft combining, arranged in accordance with at least some embodiments described herein.

As discussed above, a system according to some embodiments employs both soft forwarding and hard decodes so that both relay efficiency and fast buffer based data repair can be realized. Diagram 200 shows various process transport blocks 234, 236 for a multitude of processes (232) according to H-ARQ protocol.

The H-ARQ element of the transmission layer 230 is one in which incoming data is interpreted and combined into error checked blocks immediately. If errors are detected at this combination time, the physical layer may send a H-ARQ ACK or NACK signal and receive a retransmission in sub-frame timescales (e.g., 238, 240) so that errors are repaired without network impact (as no packets are re-requested).

The H-ARQ timing may be matched to cell size because of tight processing time budget. Without combining the efficiency of the soft forwarding and the H-ARQ to maintain high throughput levels by using repair instead of packet re-requests, the GSNR gains of EF forwarding may be lost in practical cases due to the need to re-request full packets when errors occur.

Figure 3:
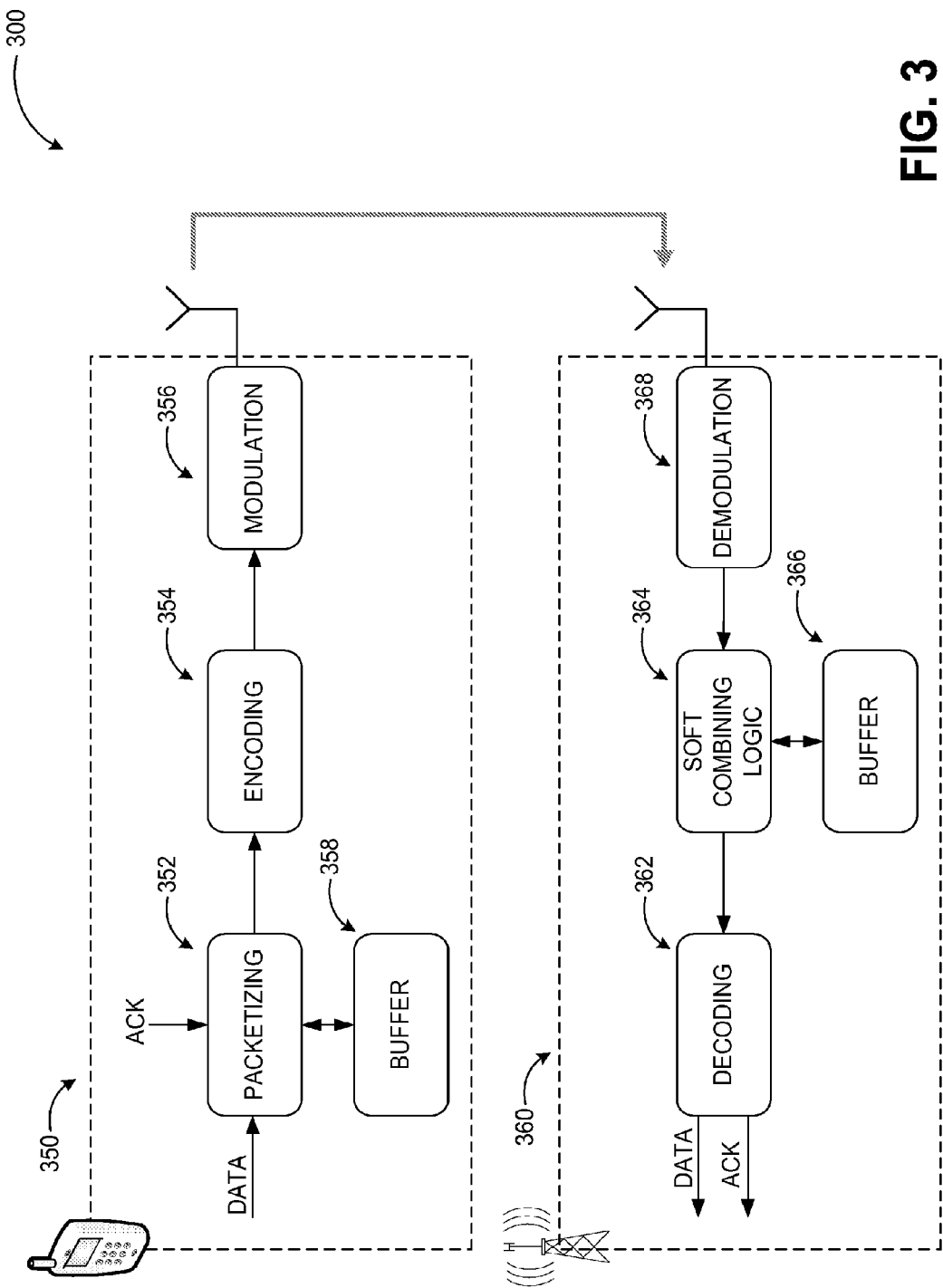
FIG. 3 illustrates conceptually an example architecture for H-ARQ.

FIG. 3 illustrates conceptually an example architecture for H-ARQ, arranged in accordance with at least some embodiments described herein. Wireless communication networks such a cellular networks according to the LTE standard may employ multiple levels of relaying. Signals from user equipment (UE) may be relayed to other relays through stationary or mobile relays (e.g., base stations, dedicated relays, relay-equipped user equipment, etc.). The example configuration in diagram 300 depicts the processing and conveyance of a wireless signal to a forwarder, which may forward the signal even further to another relay or another UE.

In an example scenario, UE 350 may packetize (352) data (e.g., audio input, other data) in conjunction with a buffer 358, encode (354) the packetized data, and modulate (356) the encoded data prior to wireless transmission to the base station 360. Upon receiving the wireless signal, the base station 360 may demodulate (368) the received signal, process it through soft combining logic 364, part of which process may include decoding 362 if the base station 360 is the destination. In other examples, the base station 360 may simply be a forwarder and soft-forward the data without decoding to another base station or a central controller. As part of the soft combining process, an acknowledgment signal (ACK) may be sent back to the UE 350 if the data is deemed to be error-free by the hard decoding and error checking process. If errors are detected and NACK signal may be sent back to the UE 350 resulting in retransmission of the data from the UE 350.

If the base station 360 is acting as a relay according to embodiments, it may combine a data efficiency of soft forwarding that increases GSNR with the ability to use H-ARQs. Performing both soft forward to the relay destination and non-forwarded hard decode within the relay, the hard decode results may be analyzed for errors locally to detect suspected bit errors so that retransmission can be obtained before a rolling buffer 366 in the relay reaches frame end.

Figure 4:
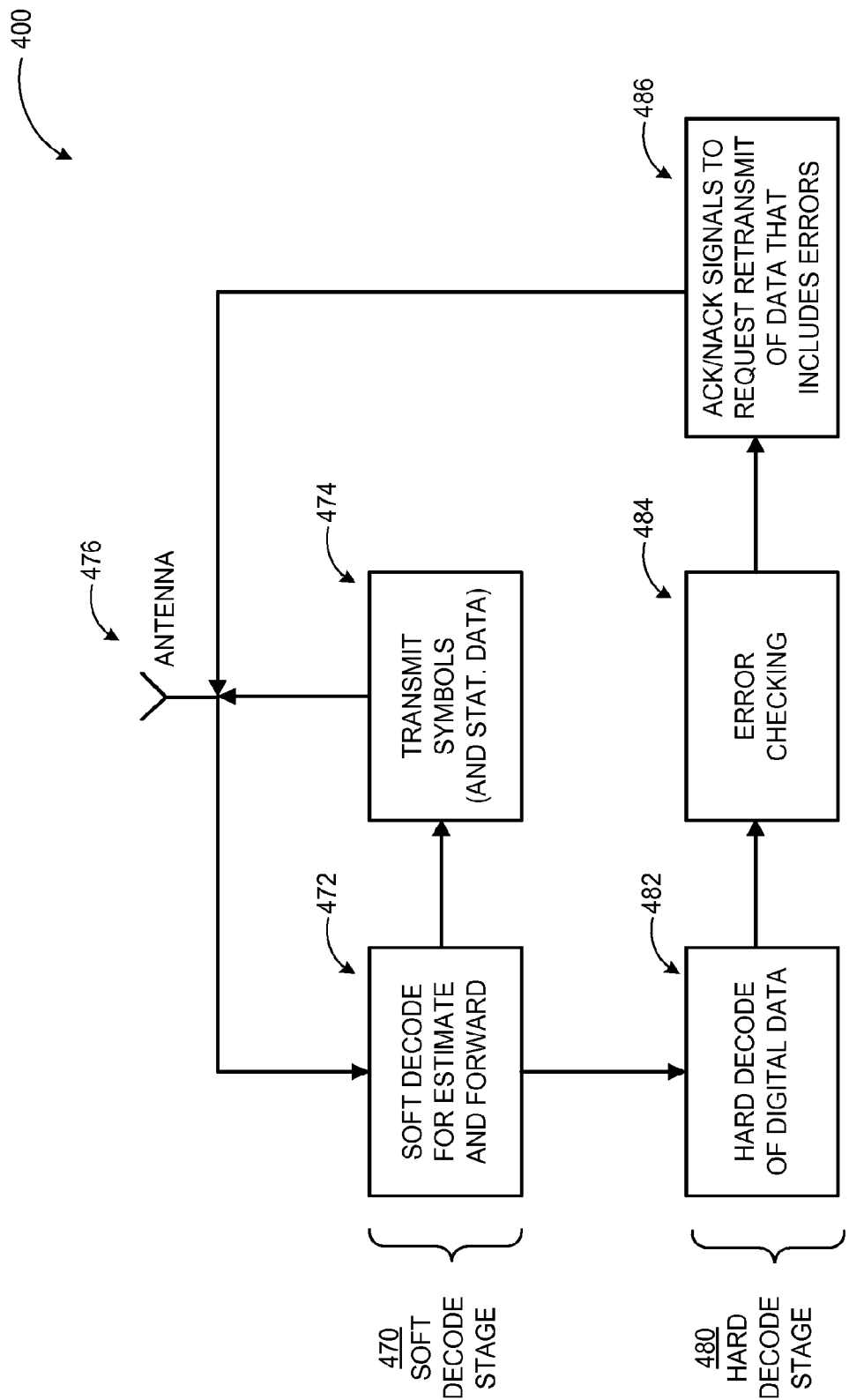
FIG. 4 illustrates a block diagram of major elements of an example combined hard/soft relay forwarding system for H-ARQ exploitation.

FIG. 4 illustrates a block diagram of major elements of an example combined hard/soft relay forwarding system for hybrid- ARQ exploitation, arranged in accordance with at least some embodiments described herein.

In a system according to some embodiments, as shown in diagram 400, a signal received through an antenna 476 may be soft decoded for EF (472) at a soft decode stage 470, following which the symbol data and possibly statistical data (symbols and statistical data) may be transmitted (474) through the antenna 476 to a next relay in the network. While the received signal is being soft decoded and forwarded to the next relay stage, it may also be hard decoded (482) for error checking (484) at a hard decode stage 480. Depending on a result of the error checking (484), ACK/NAK signals may be transmitted (486) to a previous relay stage or another source for the received signal for rapid error recovery. By using soft decode EF approach for forwarding the signal to the relay destination information rates may be optimized. The H-ARQ retransmissions may be ignored by the final destination (after they have been relayed) if the data is not considered corrupt at the final destination.

Relaying is defined somewhat vaguely in current standards and, more importantly, the hard/soft relay decision is transparent to end user devices and the eNodeB nodes (original transmitter to the forwarder) see only a hard relay, which is consistent with typical equipment deployments. Thus, existing standards may not need to be modified to implement a system according to embodiments.

Figure 5:
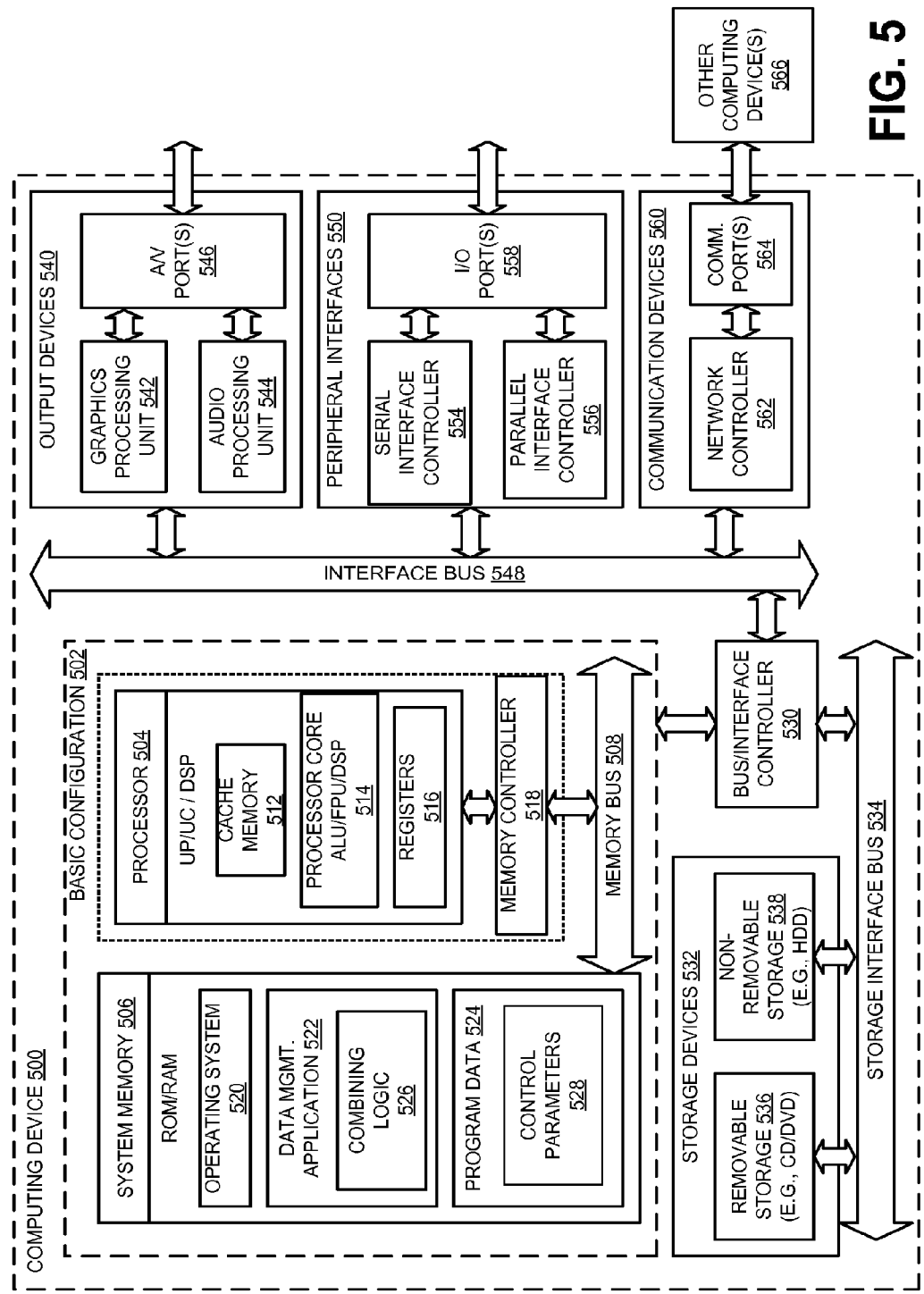
FIG. 5 illustrates a general purpose computing device, which may be used to implement combined hard/soft relay forwarding for H-ARQ exploitation.

FIG. 5 illustrates a general purpose computing device, which may be used to implement combined hard/soft relay forwarding for H-ARQ exploitation, arranged in accordance with at least some embodiments described herein. For example, computing device 500 may be used as the relay device 360 of FIG. 3. In an example basic configuration 502, the computing device 500 may include one or more processors 504 and a system memory 506. A memory bus 508 may be used for communicating between the processor 504 and the system memory 506. The basic configuration 502 is illustrated in FIG. 5 by those components within the inner dashed line.

Depending on the desired configuration, the processor 504 may be of any type, including but not limited to a microprocessor (µP), a microcontroller (µC), a digital signal processor (DSP), or any combination thereof The processor 504 may include one more levels of caching, such as a level cache memory 512, a processor core 514, and registers 516. The example processor core 514 may include an arithmetic logic unit (ALU), a floating point unit (FPU), a digital signal processing core (DSP Core), or any combination thereof An example memory controller 518 may also be used with the processor 504, or in some implementations the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof The system memory 506 may include an operating system 520, one or more traffic management applications 522, and program data 524. The traffic management applications 522 may include combining logic 526, which may combine hard/soft relay forwarding for hybrid-automatic repeat request (ARQ) exploitation as described herein. The program data 524 may include, among other data, control parameters 528, or the like, as described herein.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 548 for facilitating communication from various interface devices (e.g., one or more output devices 540, one or more peripheral interfaces 550, and one or more communication devices 560) to the basic configuration 502 via the bus/interface controller 530. Some of the example output devices 540 include a graphics processing unit 542 and an audio processing unit 544 which may be configured to communicate to various external devices such as a display or speakers via one or more AN ports 546. One or more example peripheral interfaces 550 may include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 560 includes a network controller 562, which may be arranged to facilitate communications with one or more other computing devices 566 over a network communication link via one or more communication ports 564. The one or more other computing devices 566 may include servers, communication device, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a part of a general purpose or specialized server, mainframe, or similar computer that includes any of the above functions. The computing device 500 may also be implemented as a personal computer including both laptop computer and non-laptop computer configurations.

Example embodiments may also include methods for implementing iterative simulation of requirement metrics for assumption and schema-free configuration management in cloud migration. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other examples, the human interaction can be automated such as by pre-selected criteria that may be machine automated.

Figure 6:
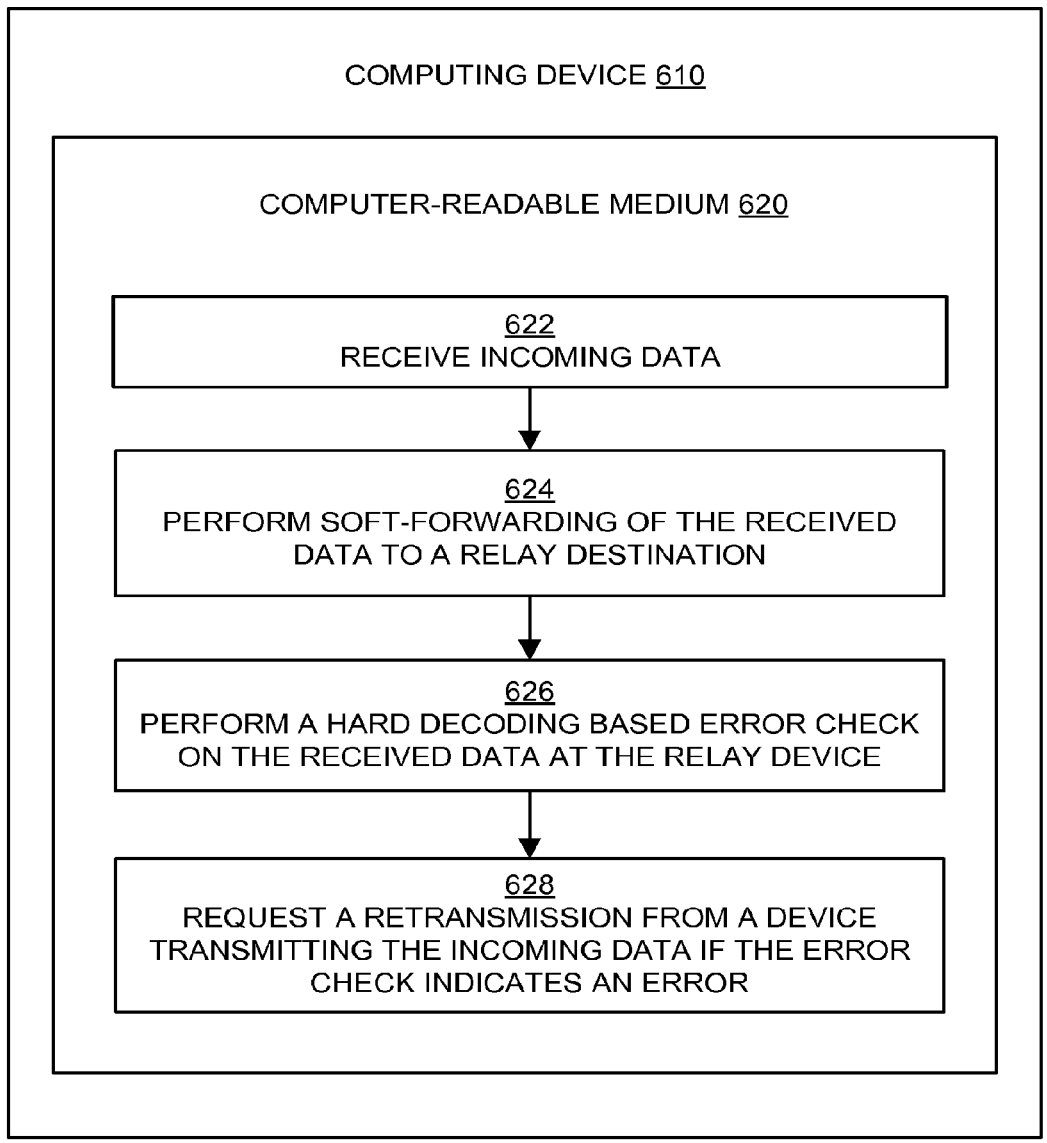
FIG. 6 is a flow diagram illustrating an example method that may be performed by a computing device such as the computing device 500 in FIG. 5.

FIG. 6 is a flow diagram illustrating an example method for combined hard/soft relay forwarding for hybrid-automatic repeat request (ARQ) exploitation that may be performed by a computing device such as the device 500 in FIG. 5, arranged in accordance with at least some embodiments described herein. Example methods may include one or more operations, functions or actions as illustrated by one or more of blocks 622, 624, 626, and/or 628. The operations described in the blocks 622 through 628 may also be stored as computer-executable instructions in a computer-readable medium such as a computer-readable medium 620 of a computing device 610.

An example process for combined hard/soft relay forwarding for hybrid-automatic repeat request exploitation may begin with block 622, "RECEIVE INCOMING DATA", where the incoming data may be received at a relay device such as relay device 360 of FIG. 3. Block 622 may be followed by block 624, "PERFORM SOFT-FORWARDING OF THE RECEIVED DATA TO A RELAY DESTINATION," where the received data may be subjected to a soft decode for estimate and forward at the soft decode stage 470 of FIG. 4 and transmitted via the antenna 476 to the relay destination (e.g., another relay).

Block 624 may be followed by block 626, "PERFORM A HARD DECODING BASED ERROR CHECK ON THE RECEIVED DATA AT THE RELAY DEVICE". At block 626, the received data buffered at the relay may be subjected to a hard decode and an error check at the hard decode stage 480 of the relay device of FIG. 4. Block 626 may be followed by block 628, "REQUEST A RETRANSMISSION FROM A DEVICE TRANSMITTING THE INCOMING DATA IF THE ERROR CHECK INDICATES AN ERROR", where the hard decode stage 480 may transmit ACK or NACK signals to the previous stage to request a retransmit of the received data if the data is found to include errors.

The blocks included in the above described process are for illustration purposes. Combined hard/soft relay forwarding for hybrid-automatic repeat request exploitation may be implemented by similar processes with fewer or additional blocks. In some examples, the blocks may be performed in a different order. In some other examples, various blocks may be eliminated. In still other examples, various blocks may be divided into additional blocks, or combined together into fewer blocks.

Figure 7:
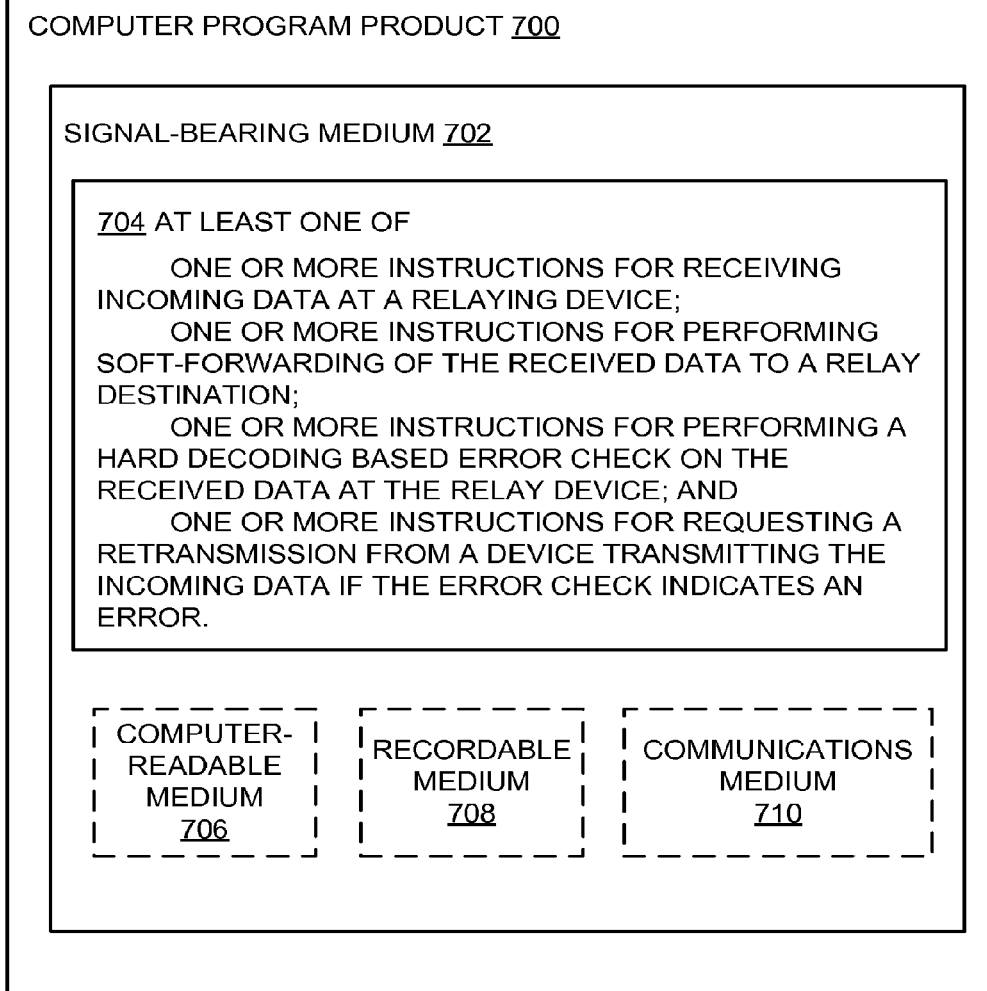
FIG. 7 illustrates a block diagram of an example computer program product, all arranged in accordance with at least some embodiments described herein.

FIG. 7 illustrates a block diagram of an example computer program product 700, arranged in accordance with at least some embodiments described herein. In some examples, as shown in FIG. 7, the computer program product 700 may include a signal bearing medium 702 that may also include one or more machine readable instructions 704 that, when executed by, for example, a processor, may provide the functionality described herein. Thus, for example, referring to the processor 504 in FIG. 5, the combining logic 526 may undertake one or more of the tasks shown in FIG. 7 in response to the instructions 704 conveyed to the processor 504 by the medium 702 to perform actions associated with combined hard/soft relay forwarding for hybrid-ARQ exploitation as described herein. Some of those instructions may include, for example, instructions for receiving incoming data at a relaying device; performing soft-forwarding of the received data to a relay destination; performing a hard decoding based error check on the received data at the relay device; and requesting a retransmission from a device transmitting the incoming data if the error check indicates an error according to some embodiments described herein.

In some implementations, the signal bearing medium 702 depicted in FIG. 7 may encompass a computer-readable medium 706, such as, but not limited to, a hard disk drive, a solid state drive, a Compact Disc (CD), a Digital Versatile Disk (DVD), a digital tape, memory, etc. In some implementations, the signal bearing medium 702 may encompass a recordable medium 708, such as, but not limited to, memory, read/write (R/W) CDs, R/W DVDs, etc. In some implementations, the signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, the program product 700 may be conveyed to one or more modules of the processor 504 by an RF signal bearing medium, where the signal bearing medium 702 is conveyed by the wireless communications medium 710 (e.g., a wireless communications medium conforming with the IEEE 802.11 standard).

According to some examples, a method for relaying data in a wireless communication network may include receiving incoming data at a relaying device, performing soft-forwarding of the received data to a relay destination, performing a hard decoding based error check on the received data at the relay device, and requesting a retransmission from a device transmitting the incoming data if the error check indicates an error.

According to other examples, the hard decoded data may not be forwarded to the relay destination. The method may also include performing the hard decoding following the soft-forwarding and/or performing the soft-forwarding and the hard decoding in parallel, where the soft-forwarding may be completed first. The soft-forwarding may employ Estimate-and-Forward (EF) or an Amplify-and-Forward (AF). The method may further include performing the hard decoding at a hybrid-automatic repeat request (H-ARQ) module in a physical layer of the relaying device. The H-ARQ module may hold a subset of the incoming data in a rolling buffer, decode the subset of the incoming data, perform the error check within one of an 8 ms response time and a sub-frame level speed; and/or transmit one of an acknowledging correct receipt (ACK) and a no-acknowledge (NACK) response to the device transmitting the incoming data.

According to further examples, the method may include if a NACK response is returned to the device transmitting the incoming data, enabling the device to retransmit the subset of the incoming data immediately such that some packet re-requests are eliminated from the relay destination. The method may also include if a NACK response is returned the device transmitting the incoming data, enabling the device to retransmit the subset of the incoming data immediately such that the error check, the NACK response, and the retransmit occur before the rolling buffer reaches a frame end. The hard decoding may be transparent to the relay destination. The relaying device may be a base station or a mobile relay device. The device transmitting the incoming data may be a base station, a user device, or a mobile relay device. The wireless communication network may employ a Long Term Evolution (LTE) architecture.

According other examples, a wireless communication network may include a plurality of user equipment (UE); one or more base stations acting as one of a source or a destination; and one or more relaying devices. The relaying devices may receive incoming data, perform soft-forwarding of the received data to the relay destination, perform a hard decoding based error check on the received data, and request a retransmission from a device transmitting the incoming data if the error check indicates an error.

According to some examples, the hard decoded data may not be forwarded to the relay destination. The relaying devices may also perform the hard decoding following the soft-forwarding and/or perform the soft-forwarding and the hard decoding in parallel. The soft-forwarding may employ Estimate-and-Forward (EF) or an Amplify-and-Forward (AF). The relaying devices may include a hybrid-automatic repeat request (H-ARQ) module in a physical layer to perform the hard decoding. The H-ARQ module may hold a subset of the incoming data in a buffer at a transmit end; decode the subset of the incoming data; perform the error check within one of an 8ms response time and a sub-frame level speed; and transmit one of an acknowledging correct receipt (ACK) and a no-acknowledge (NACK) response to the device transmitting the incoming data at a receive end.

According to other examples, the device transmitting the incoming data may be enabled to retransmit the subset of the incoming data immediately such that no packet re-request is needed from the relay destination if a NACK response is returned the device transmitting the incoming data. The device transmitting the incoming data may also be enabled to retransmit the subset of the incoming data immediately such that the error check, the NACK response, and the retransmit occur before the buffer reaches an end, if a NACK response is returned the device transmitting the incoming data. The hard decoding may be transparent to the relay destination. The device transmitting the incoming data may be a base station, a user device, or a mobile relay device. Furthermore, the wireless communication network may employ a Long Term Evolution (LTE) architecture.

According to further examples, a computer-readable storage medium may include instructions stored thereon for relaying data in a wireless communication network. The instructions may include receiving incoming data at a relaying device; performing soft-forwarding of the received data to a relay destination; performing a hard decoding based error check on the received data at the relay device; and requesting a retransmission from a device transmitting the incoming data if the error check indicates an error.

According to some examples, the hard decoded data may not be forwarded to the relay destination. The instructions may also include performing the hard decoding following the soft-forwarding and/or performing the soft-forwarding and the hard decoding in parallel, where the soft-forwarding may be completed first. The soft-forwarding may employ Estimate-and-Forward (EF) or an Amplify-and-Forward (AF). The instructions may further include performing the hard decoding at a hybrid-automatic repeat request (H-ARQ) module in a physical layer of the relaying device. The H-ARQ module may hold a subset of the incoming data in a buffer; decode the subset of the incoming data; perform the error check within one of an 8ms response time and a sub-frame level speed; and transmit one of an acknowledging correct receipt (ACK) and a no-acknowledge (NACK) response to the device transmitting the incoming data.

According to other examples, the instructions may include if a NACK response is returned to the device transmitting the incoming data, enabling the device to retransmit the subset of the incoming data immediately such that no packet re-request is needed from the relay destination. The instructions may also include if a NACK response is returned to the device transmitting the incoming data, enabling the device to retransmit the subset of the incoming data immediately such that the error check, the NACK response, and the retransmit occur before the rolling buffer reaches a frame end. The hard decoding may be transparent to the relay destination. The relaying device may be a base station or a mobile relay device. The device transmitting the incoming data may be a base station, a user device, or a mobile relay device. The wireless communication network may employ a Long Term Evolution (LTE) architecture.

According to yet other examples, a relaying device for a wireless communication network may include a receive module configured to receive incoming data; a soft-forwarding logic to perform soft-forwarding of the received data to a relay destination; and a hybrid-automatic repeat request (H-ARQ) module. The H-ARQ module may perform a hard decoding based error check on the received data and request a retransmission from a device transmitting the incoming data if the error check indicates an error.

According to further examples, the hard decoded data may not be forwarded to the relay destination. The hard decoding may also be performed following the soft-forwarding. The soft-forwarding and the hard decoding may be performed in parallel. The soft-forwarding may employ Estimate-and-Forward (EF) or an Amplify-and-Forward (AF). The H-ARQ module may be in a physical layer of the relaying device. The H-ARQ module may hold a subset of the incoming data in a rolling buffer; decode the subset of the incoming data; perform the error check within one of an 8ms response time and a sub-frame level speed; and transmit one of an acknowledging correct receipt (ACK) and a no-acknowledge (NACK) response to the device transmitting the incoming data.

According to some examples, the device transmitting the incoming data may be enabled to retransmit the subset of the incoming data immediately such that no packet re-request is needed from the relay destination if a NACK response is returned the device transmitting the incoming data. The device transmitting the incoming data may be enabled to retransmit the subset of the incoming data immediately such that the error check, the NACK response, and the retransmit occur before the rolling buffer reaches a frame end, if a NACK response is returned the device transmitting the incoming data. The hard decoding may be transparent to the relay destination. The device transmitting the incoming data may be a base station, a user device, or a mobile relay device. The wireless communication network may employ a Long Term Evolution (LTE) architecture.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof In one embodiment, several portions of the subject matter described herein may be implemented via Application Specific Integrated Circuits (ASICs), Field Programmable Gate Arrays (FPGAs), digital signal processors (DSPs), or other integrated formats as analog or digital circuits. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, a solid state drive, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors for moving and/or adjusting components and/or quantities).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g.," a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for relaying data in a wireless communication network, the method comprising:
   receiving incoming data at a relaying device;
   performing a soft-forwarding of the received data to a relay destination employing one of an Estimate-and-Forward (EF) and an Amplify-and-Forward (AF);
   performing a hard decoding-based error check on the received data at the relay device in parallel with the soft-forwarding; and
   requesting a retransmission from a device transmitting the incoming data if the hard decoding-based error check indicates an error.

2. The method according to claim 1, further comprising hard decoding the received data prior to the hard decoding-based error check, wherein the hard decoded data is not forwarded to the relay destination.

3. The method according to claim 1, further comprising performing the hard decoding following the soft-forwarding.

4. The method according to claim 1, further comprising performing the hard decoding at a hybrid-automatic repeat request (H-ARQ) module in a physical layer of the relaying device.

5. The method according to claim 1, wherein the hard decoding is transparent to the relay destination.

6. The method according to claim 1, wherein the relaying device is one of a base station and a mobile relay device.

7. A wireless communication network, comprising:
   a plurality of user equipments (UEs);
   one or more base stations acting as one of a source or a destination; and
   one or more relaying devices configured to:
      receive incoming data;
      perform a soft-forwarding of the received data to the relay destination employing one of an Estimate-and-Forward (EF) and an Amplify-and-Forward (AF);
      perform a hard decoding-based error check on the received data in parallel with the soft-forwarding; and
      request a retransmission from a device transmitting the incoming data if the hard decoding-based error check indicates an error.

8. The wireless communication network according to claim 7, wherein the relaying devices include a hybrid-automatic repeat request (H-ARQ) module in a physical layer to perform the hard decoding and the H-ARQ module is configured to:
   hold a subset of the incoming data in a buffer;
   decode the subset of the incoming data;
   perform the hard decoding-based error check within one of an 8 ms response time and a sub-frame level speed; and
   transmit one of an acknowledging correct receipt (ACK) and a no-acknowledge (NACK) response to the device transmitting the incoming data.

9. The wireless communication network according to claim 8, wherein the device transmitting the incoming data is enabled to retransmit the subset of the incoming data immediately such that no packet re-request is needed from the relay destination if a NACK response is returned to the device transmitting the incoming data.

10. The wireless communication network according to claim 8, wherein the device transmitting the incoming data is enabled to retransmit the subset of the incoming data immediately such that the error check, the NACK response, and the retransmit occur before the buffer reaches a frame end, if a NACK response is returned to the device transmitting the incoming data.

11. The wireless communication network according to claim 7, wherein the device transmitting the incoming data is one of a base station, a user device, and a mobile relay device.

12. The wireless communication network according to claim 7, wherein the wireless communication network employs a Long Term Evolution (LTE) architecture.

13. A relaying device for a wireless communication network, comprising:
   a receive module configured to receive incoming data;
   a soft-forwarding logic to perform a soft-forwarding of the received data to a relay destination employing one of an Estimate-and-Forward (EF) and an Amplify-and-Forward (AF); and
   a hybrid-automatic repeat request (H-ARQ) module configured to:
      perform a hard decoding-based error check on the received data in parallel with the soft-forwarding; and
      request a retransmission from a device transmitting the incoming data if the hard decoding-based error check indicates an error.

14. The relaying device according to claim 13, wherein the H-ARQ module is further configured to hard decode the received data prior to the hard decoding-based error check and the hard decoded data is not forwarded to the relay destination.

15. The relaying device according to claim 13, wherein the H-ARQ module is in a physical layer of the relaying device.

16. The relaying device according to claim 15, wherein the H-ARQ module is configured to:
   hold a subset of the incoming data in a rolling buffer;
   decode the subset of the incoming data;
   perform the hard decoding-based error check within one of an 8 ms response time and a sub-frame level speed; and
   transmit one of an acknowledging correct receipt (ACK) and a no-acknowledge (NACK) response to the device transmitting the incoming data.

17. The relaying device according to claim 13, wherein the hard decoding is transparent to the relay destination.

18. The relaying device according to claim 13, wherein the device transmitting the incoming data is one of a base station, a user device, and a mobile relay device.

\* \* \* \* \*